O. M. GAHAGAN

CAT HEAD

April 4, 1933.

Re. 18,789

Original Filed Jan. 14, 1929

INVENTOR.
Orren M. Gahagan
BY Arthur C. Brown
ATTORNEY

Reissued Apr. 4, 1933

Re. 18,789

UNITED STATES PATENT OFFICE

ORREN M. GAHAGAN, OF OKLAHOMA CITY, OKLAHOMA

CATHEAD

Original No. 1,762,715, dated June 10, 1930, Serial No. 332,465, filed January 14, 1929. Application for reissue filed June 9, 1932. Serial No. 616,290.

My invention relates to catheads and more particularly to a device of that character for use in connection with and operable from the draw works of rotary drilling equipment; the principal object of the invention being to provide clutch mechanism whereby operation of a cathead may be manually and automatically controlled for operating a jerk line as used in connection with wrenches and tongs for "setting up" or disconnecting tool and pipe joints.

In accomplishing these and other objects of the invention, I have provided improved details of structure, the preferred forms of which are illustrated in the accompanying drawing, wherein.

Figure 1:
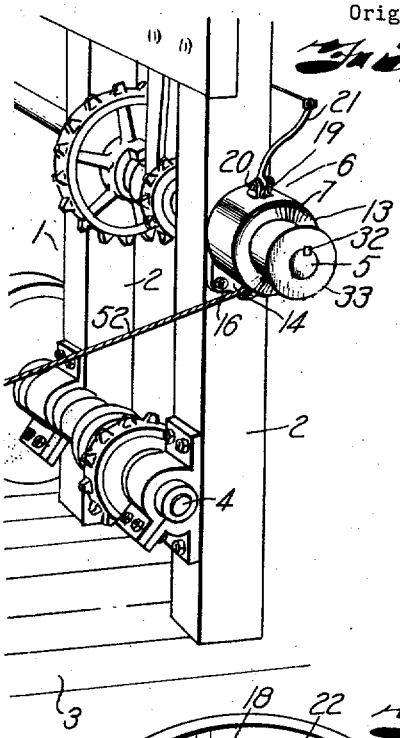
Fig. 1 is a perspective view of the device mounted on a draw works.
Figure 2:
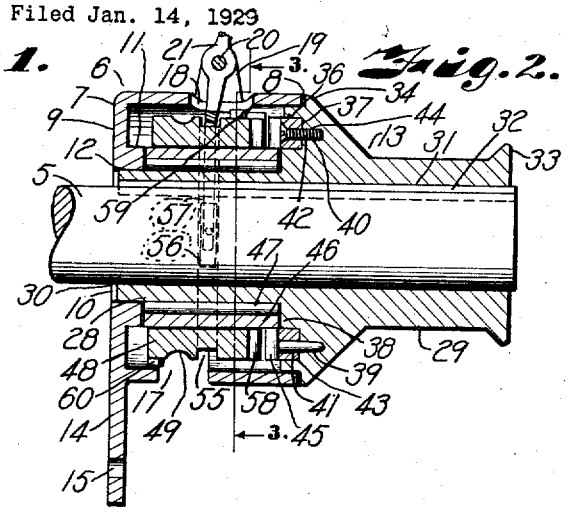
Fig. 2 is a central longitudinal section through the device showing the clutch disengaged.
Figure 3:
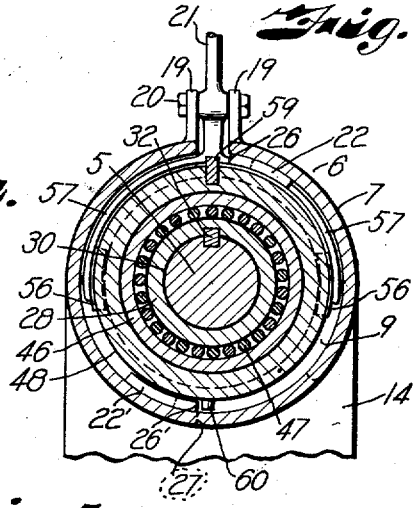
Fig. 3 is a section on the line 3—3 of Fig. 2.
Figure 4:
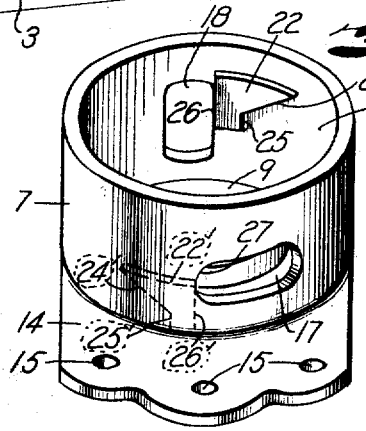
Fig. 4 is a detail perspective view of the clutch housing.
Figure 5:
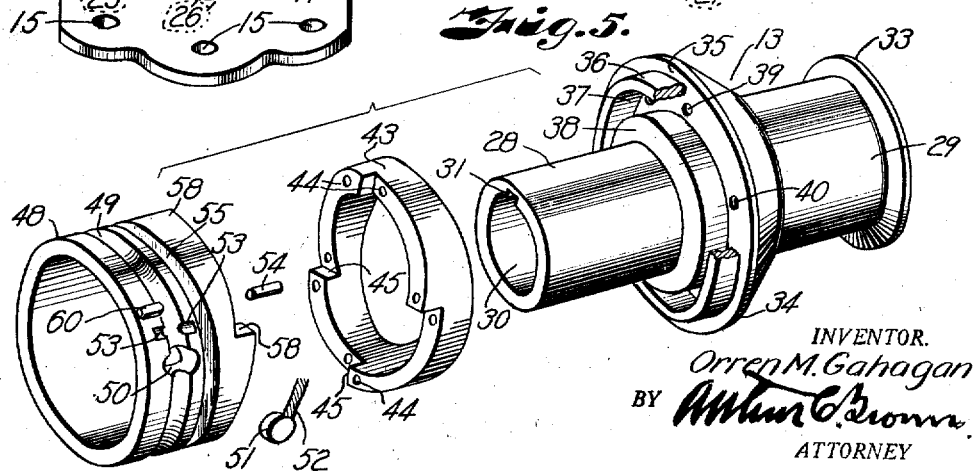
Fig. 5 is a detail perspective view of the disassembled cathead and clutch elements arranged in the order of assembly.

Referring in detail to the drawing:

1 designates a draw works including jack posts 2 mounted on a derrick platform 3 and supporting the usual drum shaft 4 and line shaft 5 from which rotary well drilling tools are operated in accordance with common practice.

The ends of the line shaft 5 protrude outwardly from the jack posts, and my improved cathead 6 is mounted on one of the protruding portions and on one of the jack posts 2 in the manner hereafter described.

The cathead 6 includes a cylindrical housing 7 having an open end 8 and an end wall 9 at its opposite end provided with an opening 10 coaxial with the housing for extension of the line shaft 5 therethrough, the end wall 9 having a hub portion 11 on its inner side forming a bearing 12 for a spool member 13 hereafter described.

Formed integrally with the housing and extending outwardly at one side thereof and in the plane of the end wall 9 is a bracket 14 provided with apertures 15 or receiving bolts 16, whereby the housing may be secured to the jack post.

Formed in the cylindrical wall of the housing adjacent the bracket 14 and offset on one side of the vertical center line thereof is an opening 17 for receiving a cable. Located diametrically opposite the opening 17 and offset on the opposite side of the vertical center line is an opening 18, and paired ears 19 protruding outwardly from the longitudinal edges of the opening 18 are fitted with a bolt 20 for pivoting a yoke lever 21.

Secured to the inner wall of the housing preferably by welding are abutment or stop-cam members 22 and 22′ identical in construction, each comprising a substantially flat body shaped to conform to the inner surface of the housing and having one side edge cut away to form a cam edge 24 and a stop shoulder 25.

The stop cam 22 is located adjacent the open end of the housing and on the opposite side of the center line with relation to the opening 18, the end edge 26 of the stop cam being in flush alignment with the longitudinal edge of the opening and the cam edge 24 facing the end wall 9 of the housing.

The cam member 22′ is located adjacent the end wall 9 and diametrically opposite the member 22. The end edge 26′ of the cam member 22 is in flush alignment with the end edge 27 of the opening 17 and the cam edge 24′ faces the end wall 9 for cooperation with the cam member 22 and complementary clutch mechanism later described.

The spool member 13 mounted in the open end 8 of the housing includes a sleeve portion 28 adapted for engagement in the bearing 12 and a spool portion 29 provided with an axial opening 30 for receiving the line shaft 5 and with a keyway 31 for receiving a key 32 whereby the spool member is fixed on the shaft. The spool portion has a radial flange 33 at its outer end.

Provided on the spool member between the spool and sleeve portions is a flange 34 equal in diameter to the housing, the outer side thereof tapering toward the flanged outer end of the spool portion 29.

The inner side face of the flange 34 is cut back to form a shoulder 35, a ring flange 36, an annular recess 37, and a hub 38, all in concentric relation with the spool member.

In assembly, the flange 36 fits loosely within the housing with the shoulder 35 spaced slightly from the end of the housing to permit free rotation of the spool member supported for rotation by engagement of the sleeve portion 28 in the bearing 12.

Provided in the flange 34 and located centrally between the ring flange 36 and hub 38 are equally spaced alternately tapered and threaded openings 39 and 40 for receiving dowel pins 41 and screws 42. 43 designates a fixed clutch member preferably comprising a ring adapted to fit snugly within the recess 37 and provided with openings 44 registering with the openings 39 and 40 to receive the pins and screws whereby the ring may be securely fixed on the spool member, and thus to the shaft.

The clutch ring 43 includes a plurality of jaws 45 adapted to protrude from the recess 37 and overlie a roller bearing collar 46 interposed between the hub 11 of the housing and the hub 38 of the spool member for retaining roller bearings 47 arranged about the sleeve portion 28, the periphery of the collar being in concentric and flush alignment with the peripheries of said hub portions.

Rotatably and slidably mounted on the collar 46 is a clutch collar 48 of slightly less diameter than the diameter between the stop-cam members 22 and 22′ in the housing, and of such width as to permit longitudinal shifting thereof between the end wall 9 of the housing and the clutch ring 43.

Formed in the collar 48 and located adjacent one end thereof is a sheave groove 49 provided with a socket 50 for receiving a knob 51 on the end of a cable 52, and located on opposite sides of the groove and adjacent the socket 50 are aligning slots 53 for receiving a pin 54 which in assembly is suitably secured in the slots and extends over the cable and serves to retain the knob in the socket, thereby securing the cable in operative position in the sheave groove.

Spaced from the sheave groove 49 and located at a substantially central position in the clutch collar is an annular race groove 55 receiving slide shoes 56 pivotally attached to arcuate arms 57 of the shifting lever 21, whereby the clutch collar may be shifted longitudinally on the bearing collar 46.

Provided on one end of the clutch collar 48 are jaws 58 adapted for mating with the jaws 45 on the clutch ring 43 and protruding radially from opposite ends of the collar 48, and located diametrically oppositely, are camming members preferably consisting of stop pins 59 and 60 adapted for cooperation with the abutment or stop-cam members 22 and 22′ respectively for determining the normal unwound position of the sheave and for effecting operative disengagement of the clutch members prior to the completion of a revolution of the clutch collar 48 on which the cable 52 is taken up.

The device being mounted on the jack posts of draw works, the cable or "jerk line" 52 is applied through the opening 17 of the housing 7 and is attached to the clutch collar 48. The opposite end of the cable may then be attached to a wrench or tongs such as are applied on well tubing, casing or drilling tools for effecting connection or disconnection of the threadedly connected sections.

The device is particularly adapted for applying the final "snap" to the joints in connected threaded sections and for "breaking" or starting the unthreading of the joints when the sections are to be disconnected.

Assuming that the device is employed for connecting the sections of well tubing and that a pair of wrenches are employed for the operation, the wrenches are applied on the adjoining couplings of the respective upper and lower tubing sections.

The wrench on the upper section is anchored against rotation and the wrench on the lower section is connected with the "jerk line" so that power may be alternately applied to and released from the wrench by means of my device and thereby cause the wrench to be intermittently drawn through an arc and released for return to its starting position, the operation being repeated until the final "snap" has been applied to the coupling.

When the device is in use the spool member 13 rotates continuously with the line shaft 5 in an anti-clockwise direction and in order to cause rotation of the clutch collar 48 for taking up the "jerk line", the clutch lever 21 is shifted by an operator causing the jaws 58 to engage the jaws 45 of the spool member.

The clutch collar 48 when rotating with the spool member causes the "jerk line" or cable 52 to be received in the sheave groove 49, and prior to the time when the collar approaches the end of a complete revolution the stop pins 59 and 60 simultaneously engage the cam edges 22 and 22′ respectively of the stop-cams, causing the clutch collar to be shifted away from the spool member whereupon the clutch jaws 58 and 45 are disengaged and the clutch collar 48 is free to be returned to its normal starting position.

Should it be desired to use the device for "breaking" tubing joints and for unthreading the sections, the "jerk" line is then attached to the wrench on the upper tubing section and the wrench on the lower section is anchored against rotation so that anti-clockwise rotation of the upper section will cause unthreading of the coupling.

What I claim and desire to secure by Letters Patent is:

1. In a device of the character described, in combination with a shaft and a shaft support, a housing mounted on the support and having an opening to receive the shaft, a spool member fixed on said shaft and having a sleeve and clutch portion in the housing, a sheave member slidable on said sleeve and having a clutch portion, means for manually shifting said sheave to effect engagement of said clutch portions, and means for automatically shifting said sheave to effect disengagement thereof.

2. In a device of the character described, in combination with a shaft and a shaft support, a housing having an opening receiving the shaft, a spool member fixed on said shaft and having a sleeve and clutch portion in the housing, a bearing collar rotatable on said sleeve, a sheave member slidable on said collar and having a clutch portion engageable with the clutch portion on said spool member, means on the housing for manually shifting said sheave to effect engagement of said clutch portions, and means for automatically shifting said sheave to effect disengagement thereof.

3. In a cathead for mounting on a draw works including a support and a shaft, a housing mounted on the draw works support and having an opening receiving the draw works shaft, a spool fixed on said shaft and having clutch jaws and a sleeve portion in the housing, a bearing collar rotatable on the sleeve, a sheave member slidable on said collar and having clutch jaws engageable with the jaws on said spool member, shifting means on the housing for manually effecting engagement of said clutch jaws, and means in the housing for automatically shifting said sheave to effect disengagement thereof.

4. In a cathead for mounting on a draw works including a supporting post and a shaft, a housing fixed on the draw works support post and having an opening receiving the draw works line shaft, a spool member keyed on said shaft and having clutch jaws and a sleeve portion in the housing, a bearing collar rotatable on said sleeve, a sheave member slidable on said collar having clutch jaws and a peripheral groove to receive a yoke, a shifting lever on the housing connected with said yoke for engaging said clutch jaws, radially protruding pins on said sheave, and stop-cam portions on the housing engageable by said pins for limiting rotation of said sheave and effecting disengagement of said clutch jaws.

5. In a cathead for mounting on draw works including a supporting post and a line shaft for operating a cable, a cylindrical housing fixed on the draw works support post and having an opening receiving the draw works line shaft, said housing having a side opening for receiving the cable, a spool member keyed on said shaft and having removable clutch jaws and a sleeve portion in the housing, a bearing collar rotatable on said sleeve, a sheave member slidable on said collar and having one end of said cable fixed thereon, said sheave having clutch jaws and a peripheral groove receiving a yoke, a shifting lever on the housing connected with said yoke for effecting engagement of said clutch jaws, radially disposed pins on said sheave, and stop-cams in the housing engageable by said pins for limiting rotation of said sheave and disengaging said clutch jaws.

6. In combination with a rotatable shaft, a shaft support, a cable, a clutch fixed to the shaft, a collar rotatable over the shaft and engaged with the cable, an abutment fixed to the support, and a camming means on the collar engageable with the abutment for shifting the collar from clutching position.

7. In combination with a rotatable shaft, a shaft support and a cable, means for moving the cable comprising a clutch element keyed to the shaft, a collar rotatable and slidable over the shaft and adapted to engage the cable and having a clutch element, manually operable means mounted on the shaft support for shifting the collar to engage the clutch elements, and automatic means, including an abutment fixed to the shaft support and camming means on the collar for disengaging the clutch elements.

8. In combination with a rotatable shaft, a shaft support, and a cable, a clutch including a ring fixed to the shaft and a collar rotatable over the shaft and engaged with the cable, a cam fixed to the support, and a stop pin on the collar engageable with the cam for shifting the collar from clutching position.

9. In combination with a rotatable shaft, a shaft support and a cable, means for moving the cable comprising a ring keyed to the shaft and a clutch element secured within the ring, a collar rotatable and slidable over the shaft and adapted to engage the cable and having a clutch element, manually operable means mounted on the shaft support for shifting the collar to engage the clutch elements, and automatic means, including a cam fixed to the shaft support and a pin on the collar, for disengaging the clutch elements.

10. In a cathead for mounting on draw works including a supporting post and a line shaft for operating a cable, the combination of a cylindrical housing fixed on the draw works support post and having an opening receiving the draw works line shaft, said housing having a side opening for receiving the cable, a spool member keyed on said shaft and having clutch jaws and a sleeve portion in the housing, a bearing collar rotatable on said sleeve, a sheave member slidable on said collar and having one end of said cable fixed thereon, said sheave having clutch jaws and a peripheral groove receiving a yoke, a shifting lever on the housing connected with said yoke for effecting engagement of said clutch jaws, a radially disposed pin on said sheave, and a stop-cam in the housing engageable by said pin for limiting rotation of said sheave and disengaging said clutch jaws.

In testimony whereof I affix my signature.

ORREN M. GAHAGAN.